United States Patent
Dubeyko et al.

(10) Patent No.: US 10,310,925 B2
(45) Date of Patent: Jun. 4, 2019

(54) METHOD OF PREVENTING METADATA CORRUPTION BY USING A NAMESPACE AND A METHOD OF VERIFYING CHANGES TO THE NAMESPACE

(71) Applicant: HGST Netherlands B.V., Amsterdam (NL)

(72) Inventors: Viacheslav Dubeyko, San Jose, CA (US); Adam Manzanares, Union City, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 92 days.

(21) Appl. No.: 15/058,538

(22) Filed: Mar. 2, 2016

(65) Prior Publication Data
US 2017/0255415 A1     Sep. 7, 2017

(51) Int. Cl.
*G06F 3/06*        (2006.01)
*G06F 11/07*       (2006.01)
*G06F 17/30*       (2006.01)

(52) U.S. Cl.
CPC ........ *G06F 11/0772* (2013.01); *G06F 3/0619* (2013.01); *G06F 3/0644* (2013.01); *G06F 3/0673* (2013.01); *G06F 11/079* (2013.01); *G06F 11/0727* (2013.01); *G06F 11/0751* (2013.01); *G06F 17/30082* (2013.01)

(58) Field of Classification Search
CPC .... G06F 3/0644; G06F 3/0619; G06F 3/0659; G06F 3/0673; G06F 11/0727; G06F 11/0751; G06F 11/0772; G06F 11/079; G06F 17/30082
See application file for complete search history.

(56) References Cited

U.S. PATENT DOCUMENTS

| | | | |
|---|---|---|---|
| 6,584,582 B1 | 6/2003 | O'Connor | |
| 7,206,785 B1 * | 4/2007 | Stephens | G06F 17/30306 707/602 |
| 7,305,393 B2 | 12/2007 | Seeger et al. | |
| 7,430,573 B2 | 9/2008 | Srinivasan et al. | |
| 7,529,745 B2 | 5/2009 | Ahluwalia et al. | |
| 7,640,412 B2 | 12/2009 | Molaro et al. | |

(Continued)

FOREIGN PATENT DOCUMENTS

WO    2014147816    9/2014

OTHER PUBLICATIONS

Metz, J. Creating Higher Performance Solid State Storage with Non-Volatile Memory Express (NVMe). Data Storage Innovation Conference. 2015. pp. 31-34.*

(Continued)

*Primary Examiner* — Paul Contino
(74) *Attorney, Agent, or Firm* — Morgan, Lewis & Bockius LLP

(57) ABSTRACT

Metadata area legends are stored at a first location, such as a dedicated partition of a persistent data storage device (PDSD). The metadata area legends have a number of descriptors that describe a number of reserved metadata areas that lie at a second location that is logically separate from the first location, such as a regular partition of the PDSD. Requests to delete the metadata area legends, as well as requests to add new metadata area legends, can be verified to prevent the metadata area legends from being accidentally or maliciously changed.

19 Claims, 7 Drawing Sheets

(56) References Cited

U.S. PATENT DOCUMENTS

| | | | |
|---|---|---|---|
| 8,086,585 B1 | 12/2011 | Brashers | |
| 8,555,022 B1* | 10/2013 | Edwards | G06F 3/0607 |
| | | | 711/114 |
| 9,250,823 B1* | 2/2016 | Kamat | G06F 3/0647 |
| 9,256,373 B1* | 2/2016 | Liang | G06F 3/0619 |
| 9,529,735 B2 | 12/2016 | Hashimoto | |
| 9,804,966 B1 | 10/2017 | Sadanandan | |
| 2003/0163553 A1* | 8/2003 | Kitamura | G06F 3/0611 |
| | | | 709/219 |
| 2006/0112096 A1* | 5/2006 | Ahluwalia | G06F 17/30079 |
| 2006/0117056 A1 | 6/2006 | Havewala et al. | |
| 2006/0129614 A1 | 6/2006 | Kim et al. | |
| 2006/0282471 A1 | 12/2006 | Mark et al. | |
| 2010/0023847 A1 | 1/2010 | Morita | |
| 2010/0125586 A1* | 5/2010 | Van Vleck | G06F 17/30038 |
| | | | 707/748 |
| 2011/0099461 A1 | 4/2011 | Rajpal | |
| 2011/0106802 A1 | 5/2011 | Pinkney et al. | |
| 2012/0110043 A1* | 5/2012 | Cavet | G06F 17/30038 |
| | | | 707/825 |
| 2012/0110281 A1 | 5/2012 | Green | |
| 2013/0067148 A1 | 3/2013 | Takagi | |
| 2014/0040540 A1* | 2/2014 | Pruthi | G06F 3/0611 |
| | | | 711/103 |
| 2014/0188957 A1* | 7/2014 | Hosoi | G06F 17/30067 |
| | | | 707/829 |
| 2014/0258599 A1 | 9/2014 | Rostoker et al. | |
| 2015/0347492 A1* | 12/2015 | Dickie | G06F 17/30371 |
| | | | 707/700 |
| 2016/0070652 A1* | 3/2016 | Sundararaman | G06F 3/0619 |
| | | | 711/154 |
| 2016/0150047 A1 | 5/2016 | O'Hare | |
| 2017/0277715 A1 | 9/2017 | Strauss | |
| 2017/0316027 A1* | 11/2017 | Mondal | G06F 17/30138 |
| 2017/0316047 A1 | 11/2017 | Dubeyko | |
| 2017/0322927 A1 | 11/2017 | Dubeyko | |

OTHER PUBLICATIONS

How can I create an empty namespace object without overwriting another object with the same name?. Feb. 24, 2012 (retrieved on Sep. 8, 2018). Retrieved from the Internet <URL:https://stackoverflow.com/questions/9425943/how-can-i-create-an-empty-namespace-object-without-overwriting-another-object-wi>.*

BC—Namespaces and Naming Conventions (BC-CTS-NAM). 2001. SAP AG.*

Recon: Verifying File System Consistency at Runtime https://www.usenix.org/legacy/events/fast/poster_refereed/Fryerposter.pdf.

Metadata Invariants: Checking and Inferring Metadata Coding Conventions http://people.cs.vt.edu/tilevich/papers/icse2012.pdf.

XFS Self Describing Metadata https://www.kernel.org/doc/Documentation/filesystems/xfs-self-describing-metadata.txt.

"Recon: Verifying File System Consistency at Runtime", Fryer, et al. University of Torono 14 pgs.

Fryer et al., Recon: Verifying File System Consistency at Runtime, University of Toronto, 2012, http://www.eecg.toronto.edu/~ashvin/publications/recon-fs-consistency-runtime.pdf, 14 pages.

* cited by examiner

METHOD OF PREVENTING METADATA CORRUPTION BY USING A NAMESPACE AND A METHOD OF VERIFYING CHANGES TO THE NAMESPACE

BACKGROUND OF THE INVENTION

1. Field of the Invention

The present invention relates to the prevention of metadata corruption and, more particularly, to a method of preventing metadata corruption by using a namespace and a method of verifying changes to the namespace.

2. Description of the Related Art

A persistent data storage device (PDSD), such as a hard disk drive (HDD), a solid-state drive (SSD), or storage that is based on the next generation of non-volatile memories (e.g., PCM, MRAM, ReRAM, 3D Xpoint), has a sequence of physical records, such as sectors, erase blocks, or other read/write units, including units to be used in the next-generation of data storage devices. Each physical record has an address, such as a Logical Block Address (LBA), and a size that is determined by the physical properties of the PDSD.

The physical records store byte streams which, on a file system level, represent user data and metadata records. Metadata records are not user data, and are not directly accessible by an end user. A metadata record contains information about a user data file or other metadata records. For example, a metadata record about a corresponding user data file can contain information about when the user data file was created, who the author was, the size of the user data file, and who has permission to access the user data file.

A blank PDSD is typically initialized by writing a partition table into one or more physical records on the PDSD. The partition table defines one or more separate areas on the PDSD, which are known as partitions. With a master boot record (MBR), each partition is defined by the LBA# where the partition begins and the number of physical records that are in the partition. With a global partition table (GPT), each partition is defined by the LBA# where the partition begins and the LBA# where the partition ends. In addition, some partition tables identify the type of file system (e.g., NTFS, FAT) used in the partition, or a known type of partition usage (e.g., PA-RISC Linux boot loader, swap partition).

After the partition table has been written to one or more physical records on the PDSD, a file system volume can be created in a partition with a file system creation utility (mkfs). In some cases, a file system volume can be created on the entire PDSD without the creation of a partition table.

Usually, a file system creation utility reserves contiguous ranges of physical records inside a partition as reserved metadata areas. Each reserved metadata area has a number of metadata nodes, which are storage buckets for metadata records. One metadata node usually holds dozens to hundreds of metadata records.

A file system driver generates requests to read and write information. A write request includes a starting logical block address (LBA) and a byte stream that is to be stored at the starting LBA. These byte streams can be composed of one or more physical records.

The file system driver, which is commonly part of the operating system, passes the write request on to a device driver (e.g., SCSI, SATA, ATA driver), which controls the flow of data to and from the PDSD. The device driver communicates with a bus adaptor by means of a special communication protocol. In addition, the device driver also converts requests from logical blocks into requests in physical records, and converts the physical records into physical signals on the lines of the bus adaptor. The device driver responds to the write request by sending the physical signals to the PDSD.

One drawback of this operation is that the device driver responds to all write requests, and is unaware of the source of a write request. As a result, a generic byte stream can be generated by accidental user error or malicious virus activity, and then passed directly to the device driver, bypassing the file system driver. In addition, buggy non-stable code in the file system driver can also generate a generic byte stream. (It can take years, e.g., 5-10 years, to discover the critical bugs in a new file system.)

As a result, the device driver can potentially write any information to any physical record on the PDSD. This can result in a generic byte stream overwriting metadata records, thereby corrupting the metadata records. Metadata corruption is very dangerous as significant amounts of corresponding user data can be lost.

SUMMARY OF THE INVENTION

The present invention provides an approach to preventing metadata corruption. The present invention includes a method of creating a namespace. The method includes reserving a number of areas as a number of reserved metadata areas on a persistent data storage device (PDSD). The method also includes creating a number of metadata area legends. The number of metadata area legends has a number of descriptors that describe the number of reserved metadata areas.

In addition, the present invention includes a computer-readable medium that contains computer executable instructions, which when executed by a computer perform a method of adding a metadata area legend to a namespace. The method includes creating a new metadata area legend that represents a new reserved metadata area. The new metadata area legend includes a magic signature of a metadata structure in the new reserved metadata area, a node size in the new reserved metadata area, and an extent of the new reserved metadata area. The method also includes determining if the magic signature in the new metadata area legend matches an existing magic signature in an existing metadata area legend. The method further includes when the magic signature in the new metadata area legend matches an existing magic signature, determining if the node size in the new metadata area legend matches an existing node size in the existing metadata area legend. In addition, the method includes when the node size in the new metadata area legend matches the existing node size, determining if a size of the extent in the new metadata area legend matches a minimum, default, or maximum clump size in the existing metadata area legend. Further, the method includes when the size of the extent matches the minimum, default, or maximum clump size, adding the new metadata area legend to the namespace.

Further, the present invention includes a computer system. The computer system includes a first persistent data storage device (PDSD) that stores a number of byte streams at a location. The number of byte streams represents a number of metadata area legends that have a number of first descriptors. The number of first descriptors describes a number of reserved metadata areas at a location that is logically separate from the location where the number of byte streams is stored. The computer system also includes a processor coupled to the first PDSD. The processor prepares a number of legends as a number of prepared area legends that includes a number of second descriptors that correspond with the number of first descriptors. The processor determines whether the second descriptors from the prepared area legends differ from the first descriptors. Further, the processor signals an error when the second descriptors from the prepared area legends differ from the first descriptors.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Descriptive data about the reserved metadata areas is collected and stored at a location, such as a location on a persistent data storage device (PDSD), which is logically separate from a second location, such as another location on the PDSD, which includes the reserved metadata areas.

For example, when a partition table is created and stored on a PDSD, and a file system with reserved metadata areas is created and stored in a regular partition on the PDSD, the descriptive data about the reserved metadata areas can be stored in the partition table (when space allows) or in a dedicated partition on the PDSD.

Alternately, the descriptive data can be stored in a special dedicated PDSD, such as a NOR flash, NAND flash, or next-generation non-volatile memory (NVM), while a file system with reserved metadata areas can be created and stored on a second PDSD. The dedicated PDSD and the second PDSD can be combined into one unit, such as a flash memory (dedicated PDSD) that is included in a hard disk drive (second PDSD). In one embodiment the second PDSD has a partition table, while in a second embodiment the second PDSD has no partition table.

The descriptive data about the reserved metadata areas is collected and stored in a different partition from the partition that holds the reserved metadata areas, or in a special dedicated PDSD to provide an independent and protected source of the descriptive data about the reserved metadata areas. Having an independent and protected source of the descriptive data substantially reduces the likelihood of the metadata becoming corrupted.

A special flag, which indicates whether a write request is a metadata write request or a user data write request, can be associated with every write request. The descriptive data, in conjunction with the special flag, can then be used to verify the write requests that address a reserved metadata area, and the write requests that address areas that lie outside of the reserved metadata areas. Invalid write requests are identified, and optionally terminated. As a result, a generic byte stream generated by accidental user error, malicious virus activity, or buggy non-stable code can be prevented from being written into the reserved metadata areas.

Figure 1:
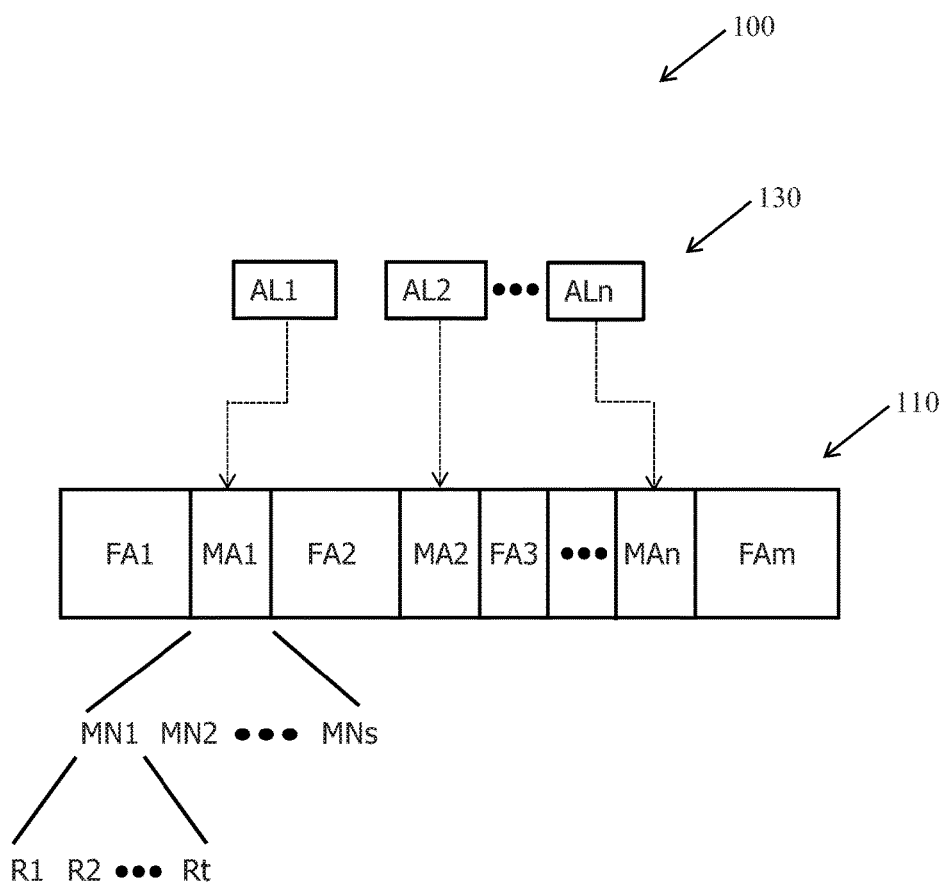
FIG. 1 is a diagram illustrating an example of a generalized, verification architecture 100 in accordance with the present invention.

The present invention includes the creation of a namespace for the descriptive data, and the verification of attempts to delete descriptive data or add additional descriptive data. FIG. 1 shows a diagram that illustrates an example of a generalized, verification architecture 100 in accordance with the present invention.

As shown in the FIG. 1 example, architecture 100 includes a regular partition 110 that includes a number of free space areas FA1-FAm and a number of reserved metadata areas MA1-MAn that are spaced apart by, and adjoin, the free space areas FA1-FAm. The free space areas FA can be used for user data or the reservation of additional metadata areas should the need arise.

Each reserved metadata area MA includes a metadata structure. In the present example, the metadata structure is stored on the file system volume. The metadata structure, which defines relations between physical records, can optionally be identified by a magic signature (or number). The file system creation utility, which creates a number of types of metadata structures, associates a metadata structure with a reserved metadata area. Each reserved metadata area MA also includes a number of metadata nodes MN1-MNs. Each metadata node MN in a reserved metadata area MA has the same size, which can be any value, but in the present example is sized during the creation of the file system volume as $2^N$ KB, where N is an integer greater than one, e.g., 4 KB, 8 KB, 16 KB, 32 KB, 64 KB. The metadata nodes MN1-MNs are storage buckets for a number of metadata records R1-Rt. In other words, a number of metadata records R1-Rt are stored together as a group in a metadata node MN in a reserved metadata area MA.

As further shown in FIG. 1, architecture 100 includes a namespace 130 that includes a number of metadata area legends AL1-ALn that corresponds with the number of reserved metadata areas MA1-MAn. Each metadata area legend AL holds descriptive data about a reserved metadata area MA. In addition, the free space areas FA1-FAm and the reserved metadata areas MA1-MAn of regular partition 110 are located on a PDSD, while the metadata area legends AL1-ALn are located at a logically separate location on the PDSD or in a special dedicated PDSD.

Figure 2A:
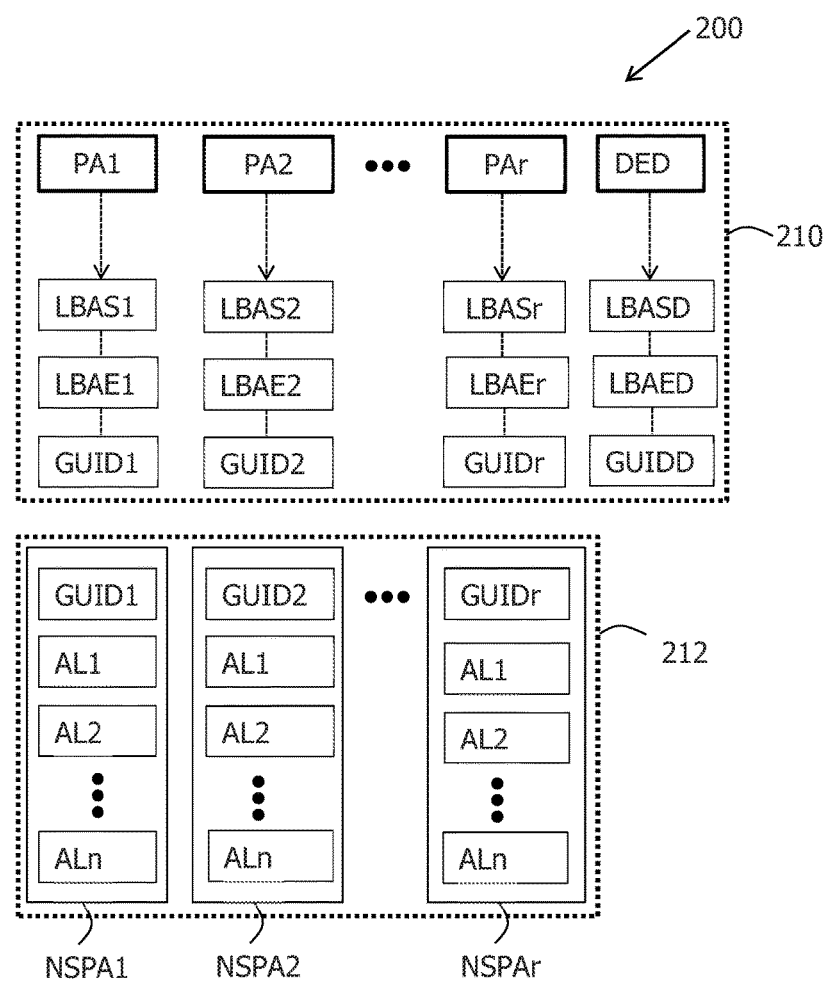
FIG. 2A is a diagram illustrating an example of a PDSD layout 200 in accordance with the present invention.

FIG. 2A shows a diagram that illustrates an example of a PDSD layout 200 in accordance with the present invention. Layout 200 includes a partition table 210 that defines a number of partitions, with each partition being defined by the LBA# where the partition begins, and either the number of physical records (or sectors) in the partition (MBR) or the LBA# where the partition ends (global partition table (GPT)).

As shown in the FIG. 2A example, partition table 210 defines a number of regular partitions PA1-PAr and a dedicated partition DED, and stores a starting address LBAS (LBAS1-LBASr and LBASD) and an ending address LBAE (LBAE1-LBAEr and LBAED) for each partition PA and DED in partition table 210.

Partition table 210, which is implemented as a GPT in the present example, also stores a globally unique identification number GUID (GUID1-GUIDr and GUIDD) for each partition PA and DED in partition table 210. In addition, some partition tables identify the type of file system (e.g., NTFS, FAT) that is used in the partition, or alternately a known type of partition usage (e.g., PA-RISC Linux boot loader, swap partition).

As further shown in the FIG. 2A example, PDSD layout 200 also includes a dedicated partition 212, which shows the contents of the partition defined by the dedicated partition DED in partition table 210. Dedicated partition 212 includes a number of namespaces NSPA1-NSPAr that correspond with the number of regular partitions PA1-PAr.

As additionally shown in the FIG. 2A example, each namespace NS has the GUID number of a corresponding partition PA, and a number of metadata area legends AL1-ALn that describe a corresponding number of reserved metadata areas (e.g., MA1-MAn of FIG. 1) in the corresponding partition PA.

Figure 2B:
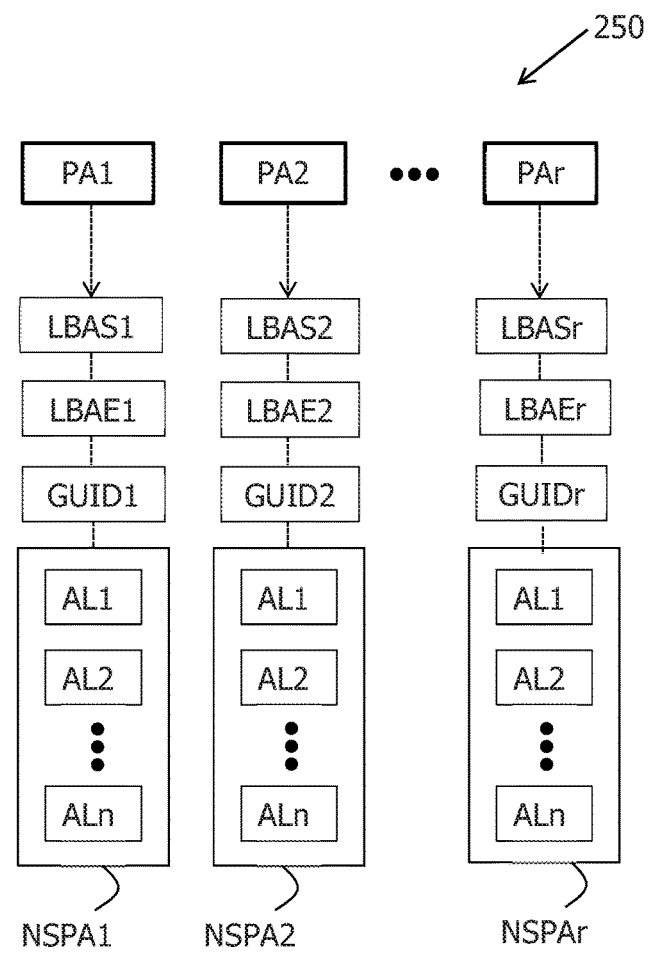
FIG. 2B is a diagram illustrating an example of a partition table 250 in accordance with the present invention.

FIG. 2B shows a diagram that illustrates an example of a partition table 250 in accordance with the present invention. Partition table 250 is similar to partition table 210 and, as a result, utilizes the same reference identifiers to identify the elements that are common to both partition tables.

As shown in FIG. 2B, partition table 250 differs from partition table 210 in that partition table 250 modifies partition table 210 to remove the dedicated partition DED, and include a number of namespaces NSPA1-NSPAr. In the FIG. 2B example, partition table 250 has a namespace NS for each partition PA. Each namespace NS, in turn, has a number of metadata area legends AL1-ALn that describe a corresponding number of reserved metadata areas (MA1-MAn).

Figure 3:
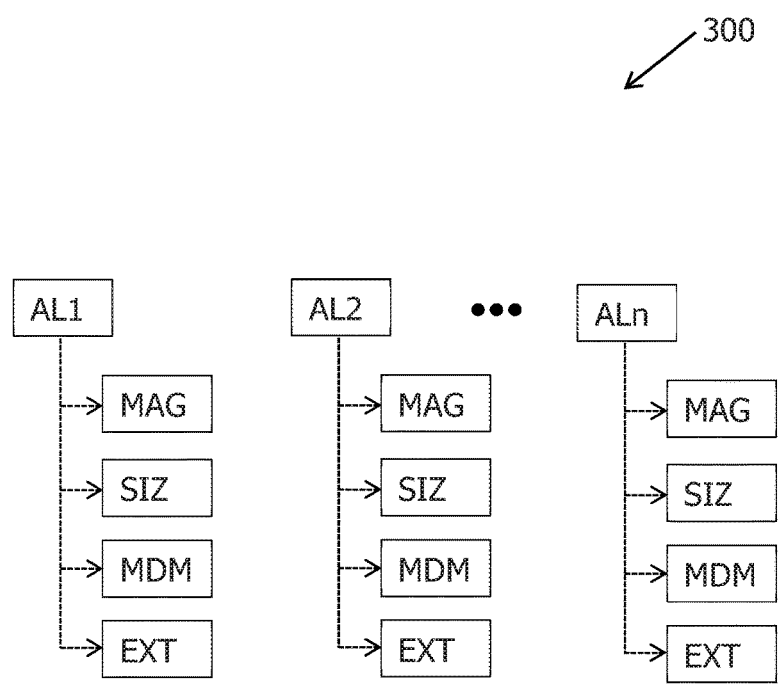
FIG. 3 is a diagram illustrating an example of namespace 300 in accordance with the present invention.

FIG. 3 shows a diagram that illustrates an example of a namespace 300 in accordance with the present invention. As shown in FIG. 3, namespace 300 includes a number of metadata area legends AL1-ALn that describe a corresponding number of reserved metadata areas (e.g., MA1-MAn in FIG. 1) in a partition.

A metadata area legend AL, which describes a reserved metadata area, has a magic signature (or number) MAG that uniquely identifies the metadata structure in the reserved metadata area. The metadata area legend AL also includes a node size SIZ, which is the size of the metadata nodes, e.g., 4 KB, 8 KB, 16 KB, in the reserved metadata area. (The metadata nodes in the same reserved metadata area all have the same size.)

In addition, the metadata area legend AL includes min/default/max clump values MDM for the metadata structure in the reserved metadata area. The min/default/max clump values MDM identify the smallest, default, and largest possible size of space reservation for metadata areas, respectively, that the file system driver can use to create additional reserved metadata areas for this type of metadata structure should the need arise.

Further, the metadata area legend AL includes an extent EXT that describes the location of the reserved metadata area with two numbers: (1) a starting LBA number; and (2) the number of physical records inside the reserved metadata area. For a reserved metadata area that starts from LBA100 and includes 200 physical records, the extent EXT can be represented as {LBA100; 200}.

A file system is created by means of a file system creation utility (e.g., mkfs). In the present invention, a modified file system creation utility creates a namespace to describe a number of reserved metadata areas. The modified file system creation utility can create a new namespace when no namespace exists or, when a namespace already exists, delete the existing namespace followed by the creation of a new namespace.

Figure 4:
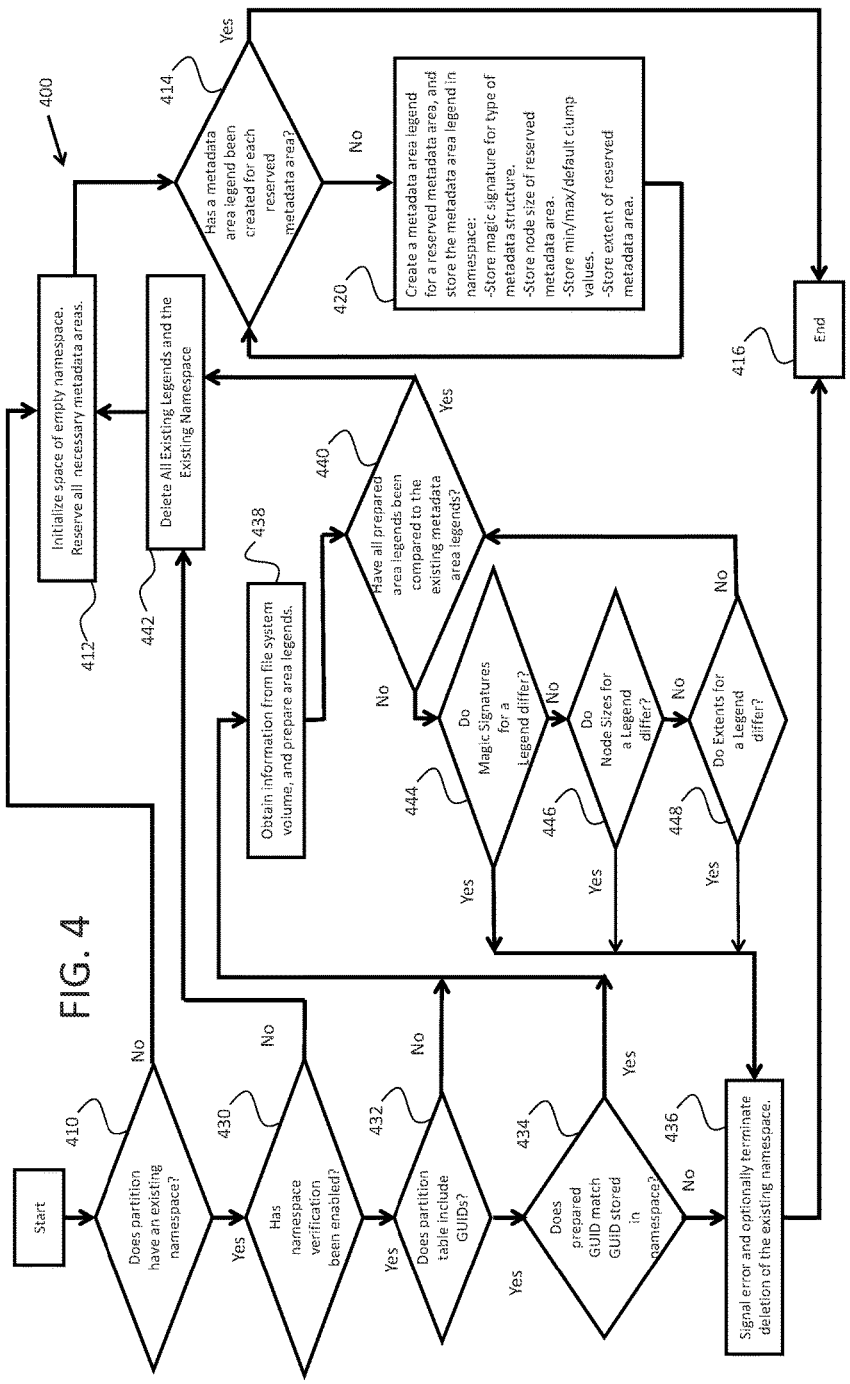
FIG. 4 is a flow chart illustrating an example of a method 400 of creating a verified namespace in accordance with the present invention.

FIG. 4 shows a flow chart that illustrates an example of a method 400 of creating a verified namespace in accordance with the present invention. Method 400 is part of the modified file system creation utility, which includes the elements of a conventional file system creation utility as modified by the present invention. The operating system checks the privileges for all operations. This check takes place during application (mkfs) start-up. If the application does not have the privileges, then no operations are available.

As shown in FIG. 4, method 400 begins at 410 by determining whether a partition has an existing namespace. When no namespace exists, method 400 moves from 410 to 412 to initialize a space of empty namespace, such as a part of a dedicated partition or a special dedicated memory, such as a NOR flash, NAND flash, or next-generation NVM. (Several namespaces can be stored in one dedicated partition or special dedicated memory.) After initialization, method 400 reserves all necessary metadata areas in the partition and moves from 412 to 414 to determine if a metadata area legend has been created for each reserved metadata area in the partition.

When each reserved metadata area in the partition has a corresponding metadata area legend, method 400 moves from 414 to 416 to stop. Otherwise, method 400 moves from 414 to 420 to create a metadata area legend for a reserved metadata area, and store the metadata area legend in the empty namespace.

To create a metadata area legend that describes a reserved metadata area, method 400 prepares a number of descriptors that describe the reserved metadata area, and then stores the descriptors as the contents of the metadata area legend. In the present example, the descriptors include the magic signature of the metadata structure in the reserved metadata area. The descriptors also include the node size of the metadata nodes in the reserved metadata area.

Further, the descriptors include min/default/max clump values MDM for the metadata structure in the reserved metadata area. The min/default/max clump values MDM are set by the modified file system creation utility to identify the smallest, default, and largest areas, respectively, that the file system driver can use to reserve additional reserved metadata areas for this type of metadata structure should the need arise.

The modified file system creation utility reserves metadata areas during file system volume creation. However, the file system driver can also reserve another clump of reserved space for a metadata structure in case the initially reserved area becomes exhausted by too many metadata records. The degree that the free space in the file system volume is fragmented is hard to predict when trying to reserve another contiguous space for metadata area. As a result, the file system driver can use the min/default/max clump values MDM during a search of contiguous free area for a reservation.

In addition, the descriptors include an extent of the reserved metadata area (starting LBA and the number of physical records inside the reserved metadata area). After the metadata area legend has been created and stored, method 400 returns to 414 to again determine if a metadata area legend has been created for each reserved metadata area.

Occasionally, a partition needs to be reformatted for a new file system. When this occurs, the existing namespace associated with the existing file system must be deleted and replaced with a new namespace for the new file system. In this case, referring to FIG. 4, the modified file system creation utility again begins at 410 by determining whether a partition, in this case the partition to be reformatted, has an existing namespace. For example, when partition PA2 in FIGS. 2A and 2B is to be reformatted, method 400 determines whether partition PA2 has an existing namespace.

When the partition to be reformatted already has an existing namespace (partition PA2 has an existing namespace NSPA2), method 400 prepares to delete the existing namespace, and moves from 410 to 430 to determine whether namespace verification has been enabled. Namespace verification is a process whereby any attempt to delete an existing namespace must be verified before the change can take effect. Namespace verification can be enabled, for example, with a hardware jumper that sets a flag which indicates that namespace verification has been enabled.

When namespace verification has been enabled, method 400 moves from 430 to 432 to determine if the partition table includes GUIDs. When the partition table includes GUIDs, method 400 moves from 432 to 434 to obtain the GUID of the partition that is to be re-formatted from the partition table to form a prepared GUID. Method 400 then determines whether the prepared GUID matches the GUID stored in the namespace for the partition that is to be reformatted. For example, when partition PA2 in FIGS. 2A and 2B is to be reformatted, method 400 determines whether GUID2 stored in partition table 210/250 (the prepared GUID), matches GUID2 stored in namespace NSPA2 (the GUID stored in the namespace).

When the prepared GUID from the partition table fails to match the GUID stored in the namespace, method 400 moves from 434 to 436 to signal an error and optionally terminate the deletion of the existing namespace. When the prepared GUID matches the GUID stored in the namespace, method 400 moves from 434 to 438 to obtain information about the reserved metadata areas from the file system volume on the partition, and prepare a number of area legends. The prepared area legends, in turn, have corresponding existing metadata area legends in the existing namespace.

A prepared area legend represents a reserved metadata area, and includes a number of descriptors that correspond with one or more of the descriptors in an existing metadata area legend that represents the same reserved metadata area. In the present example, one of the descriptors in a prepared area legend is the magic signature of the metadata structure in the reserved metadata area.

In addition, a prepared area legend also includes the single size of the metadata nodes within the reserved metadata area. Further, a prepared area legend includes the extent of the reserved metadata area. When the partition table does not include GUIDs, such as with the partition table in a MBR, method 400 moves from 432 to 438.

After the prepared area legends have been formed, method 400 compares the descriptors in the prepared area legends to the descriptors in the corresponding existing metadata area legends. Method 400 also signals an error when the descriptors from the prepared area legends differ from the descriptors in the existing metadata area legends.

In the FIG. 4 example, after the prepared area legends have been formed, method 400 moves from 438 to 440 to determine if all of the prepared area legends have been compared to the existing metadata area legends. When all of the prepared area legends have been compared, method 400 moves from 440 to 442 to delete all of the existing metadata area legends and the existing namespace, and then moves back to 412.

If it is determined at 430 that namespace verification has not been enabled, method 400 moves directly from 430 to 442. If the administrator does not need data protection in the namespace (did not set the flag to indicate that namespace verification was enabled), then it is safe to delete the namespace at once by moving from 430 to 442.

When all of the prepared area legends have not been compared, method 400 moves from 440 to 444 to determine if the magic signature in a prepared area legend differs from the magic signature stored in a corresponding existing metadata area legend in the existing namespace. When the magic signature in the prepared area legend differs from the magic signature stored in the existing metadata area legend, method 400 moves from 444 to 436 to signal an error and optionally terminate deletion of the existing namespace.

When the magic signatures match, method 400 moves from 444 to 446 to determine if the node size in the prepared area legend differs from the node size stored in the existing metadata area legend. When the node size in the prepared area legend differs from the node size stored in the corresponding existing metadata area legend, method 400 moves from 446 to 436 to signal an error and optionally terminate deletion of the existing namespace.

When the node sizes match, method 400 moves from 446 to 448 to determine if the extent in the prepared area legend differs from the extent stored in the corresponding existing metadata area legend. When the extent for the metadata legend in the prepared area legend differs from the extent stored in the existing metadata area legend, method 400 moves from 448 to 436 to signal an error and optionally terminate deletion of the existing namespace. When the extents match, method 400 moves from 448 to 440 to again determine if every prepared area legend has been compared.

Thus, the present invention can require that any attempt to delete an existing namespace be verified before the existing namespace and the metadata area legends in the namespace are deleted. As a result, the present invention prevents a namespace and the metadata area legends in the namespace from being deleted as a result of accidental (user error), malicious (virus), or buggy code activity.

Figure 5:
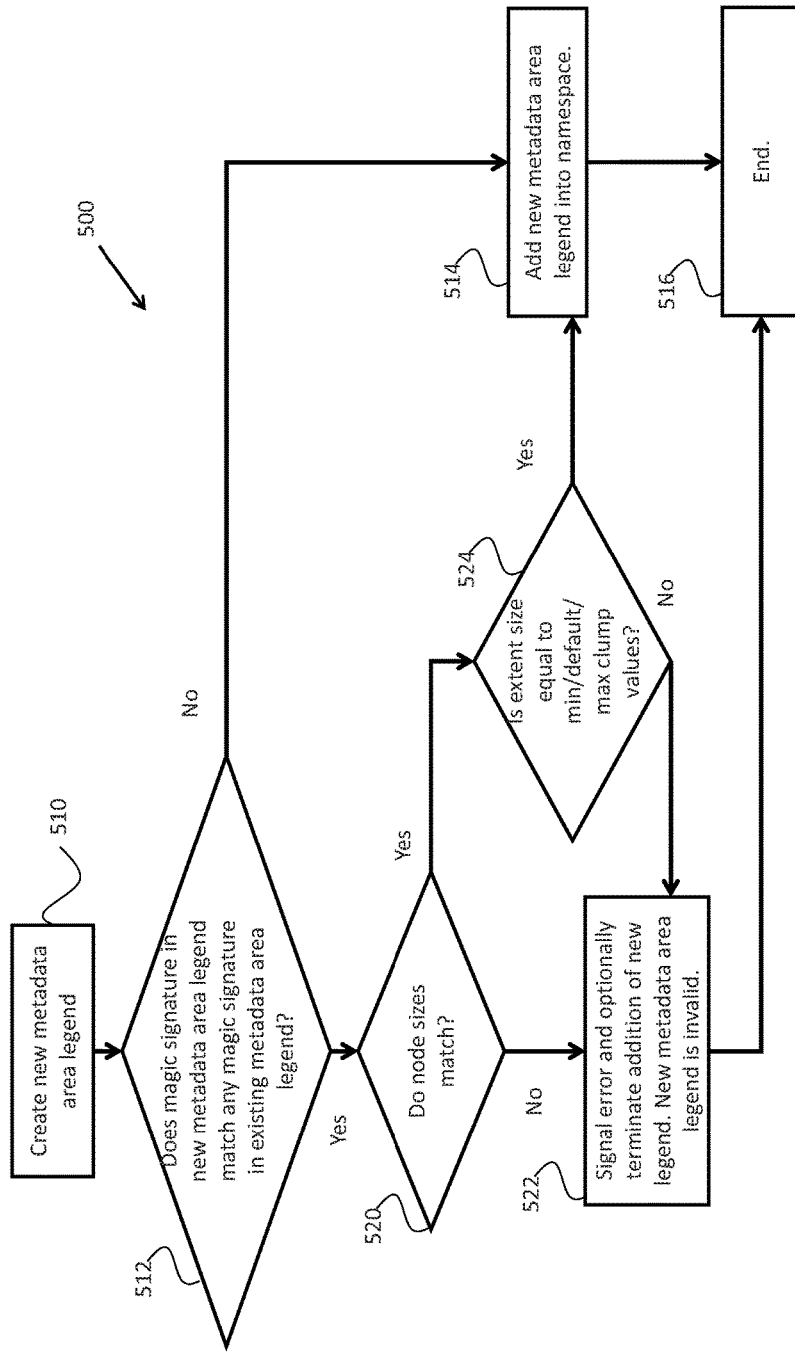
FIG. 5 is a flow chart illustrating an example of a method 500 of adding a new metadata area legend to a namespace in accordance with the present invention.

When the need arises to reserve an additional metadata area, the file system driver must add a new metadata area legend to the namespace. FIG. 5 shows a flow chart that illustrates an example of a method 500 of adding a metadata area legend to a namespace in accordance with the present invention.

As shown in FIG. 5, method 500 begins at 510 by creating a new metadata area legend that describes a new reserved metadata area. The new metadata area legend has a number of descriptors that correspond with the descriptors in a metadata area legend that was created in 420 in FIG. 4. The new metadata area legend includes the magic signature of the metadata structure in the new reserved metadata area, the node size of the metadata nodes in the new reserved metadata area, and the extent of the new reserved metadata area.

Following this, method 500 moves to 512 to determine if the magic signature in the new metadata area legend matches any magic signature of the existing metadata area legends in the namespace. When the magic signatures do not match, method 500 moves from 512 to 514 to add the new metadata area legend into the namespace.

When the magic signatures match, which indicates that an area legend for the same type of metadata structure is present, method 500 verifies that the node size and extent in the new metadata area legend are consistent with the node size and extent for that type of metadata structure.

In the FIG. 5 example, method 500 moves from 512 to 520 to determine if the node size in the new metadata area legend matches the node size in an existing metadata area legend with a matching magic signature. When the node sizes differ, method 500 moves from 520 to 522 to signal an error and optionally terminate the addition of the new metadata area legend, and then moves to 514 to stop. In this case, the new metadata area legend is invalid.

Otherwise, when the node sizes match, method 500 moves from 520 to 524 to determine if the size of the extent in the new metadata area legend is equal to the minimum, default, or maximal clump size in the existing metadata area legend with the matching magic signature. (The extent size could provide an opportunity to store some amount of metadata nodes.)

When the extent size is not equal to the minimum, default, or maximal clump size, method 500 moves from 524 to 522 to signal an error and optionally terminate the addition of the new metadata area legend, and then moves to 514 to stop. When the extent size is equal to the minimum, default, or maximal clump size, method 500 moves from 524 to 512 to add the new metadata area legend to the namespace.

The information in a namespace can be used by a method that verifies write requests. Every request to write includes a starting LBA number and a byte stream. When a write request has been received, the method determines whether the LBA number from the write request overlaps with the extent of a metadata area legend. When the LBA number from the write request does not overlap the extent of any metadata area legend in the namespace, the method writes the byte stream in the request.

When the LBA number from the write request overlaps an extent of a metadata area legend, the method verifies the write request by determining whether the byte stream in the write request includes a magic signature, which is also stored in the metadata area legend. When the byte stream does not include a magic signature, the method moves to signal an error and optionally terminate the write request. In some embodiments a magic signature is never present, in which case this determination is skipped.

When the byte stream includes a valid magic signature (or the write request includes the special flag that indicates that the write request is a metadata write request, for the case when there is no magic signature in the block), the method determines if the LBA in the write request is to a valid LBA number. LBA validity checking means that the whole write request should be inside of the reserved metadata area. When the LBA is not a valid LBA number, the method signals an error and optionally terminates the write request.

When the LBA number is valid, the method determines if the node size is valid. A write request has some size in bytes. Node size validity checking means that the size of the write request should be equal to the byte size of one or several nodes. When the write request size is not valid, the method signals an error and optionally terminates the write request. When the write request size is valid, the method stores the byte stream on the PDSD.

Thus, regardless of where a write request originates from, the method ensures that when the LBA of the write request is to a known reserved metadata area, the write request is verified before the byte stream in the write request is stored. As a result, a byte stream can be prevented from being written into a reserved metadata area unless the write request satisfies these conditions, which is unlikely to occur with an erroneous, malicious, or buggy write request.

Figure 6:
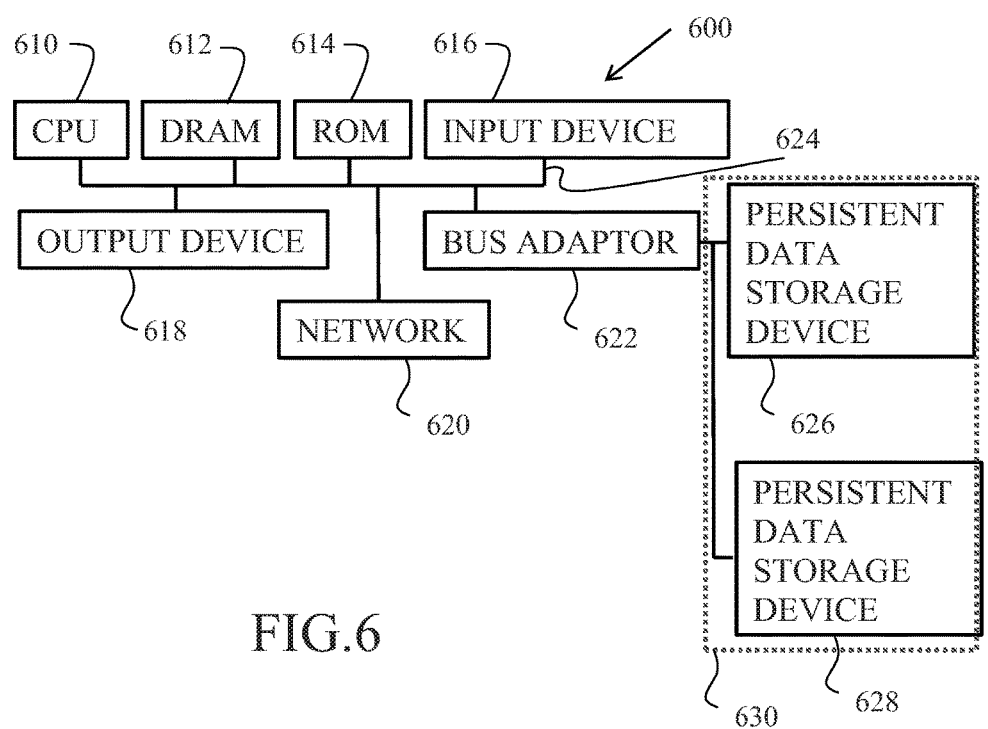
FIG. 6 is a block diagram illustrating an example of a computer system 600 in accordance with the present invention.

FIG. 6 shows a block diagram that illustrates an example of a computer system 600 in accordance with the present invention. As shown in FIG. 6, computer system 600 includes a processor 610, a dynamic random access memory (DRAM) 612, a read only memory (ROM) 614, an input device 616, an output device 618, a network adaptor 620, a bus adaptor 622, and a bus 624 that couples each of the above together.

Processor 610 can be implemented with, for example, a central processing unit (CPU), a custom integrated circuit, or graphical processing unit (GPU). DRAM 612 and ROM 614 can be implemented with conventional DRAMs and ROMs. Input device 616 can be implemented with, for example, keyboards, touchscreens, and pointing devices (e.g., mouse). Output device 618 can be implemented with, for example, printers and display devices. Network adaptor 620 can be implemented with a conventional device that provides communication with the internet or a local area network.

In addition, computer system 600 includes a persistent data storage device (PDSD) 626 and an optional PDSD 628 that are coupled to bus adaptor 622. PDSD 626 and PDSD 628 can be combined into one unit 630 that is coupled to bus adaptor 622. PDSD 626 and PDSD 628 can be implemented with a hard disk drive (HDD), a solid-state drive (SSD), or storage that is based on the next generation of NVM memory devices (e.g., PCM, MRAM, ReRAM, 3D Xpoint).

In one embodiment, PDSD 626 is implemented as a HDD, while PDSD 628 is not used. In another embodiment, PDSD 626 is a HDD with no partition table, while PDSD 628 is a flash memory. In yet another embodiment, PDSD 626 is a HDD with a partition table, while PDSD 628 is a flash memory. In addition, the present invention is valid for any data storage that can be used by block-oriented file systems (e.g., ext4, xfs, HFS+, NTFS, FAT).

Byte streams that represent a number of metadata area legends that have a number of first descriptors are stored in a dedicated partition of PDSD 626 or in PDSD 628. The number of first descriptors, in turn, describes a number of reserved metadata areas in a regular partition on PDSD 626.

Processor 610 reads the byte streams from the dedicated area on PDSD 626 (or PDSD 628 when used) once during start up, and stores the byte streams as the number of metadata area legends in DRAM 612. When a metadata area legend is to be created, deleted or added, processor 610 retrieves and executes instructions, and stores and retrieves data, from one or more of DRAM 612, ROM 614, PDSD 626, and PDSD 628 to implement methods 400 and 500.

Thus, processor 610 generates a number of prepared area legends that includes a number of second descriptors that correspond with the number of first descriptors from the metadata area legends. Processor 610 also determines whether the second descriptors from the prepared area legends differ from the first descriptors, and signals an error when the second descriptors differ from the first descriptors.

Processor 610 can also reserve a number of areas as a number of reserved metadata areas in a regular partition on PDSD 626, and create a number of metadata area legends. The number of metadata area legends has a number of descriptors that describe the number of reserved metadata areas that lie in the regular partition on PDSD 626. In addition, processor 610 can store the number of metadata area legends in the dedicated partition of PDSD 626 (or PDSD 628 when used).

Alternately, methods 400 and 500 can be implemented by PDSD 626. All information (whether metadata or user data) is initially stored in the memory pages of DRAM 612. When information is to be written into PDSD 626, processor 626 prepares and initiates the write request. Write request can contain either user data or metadata.

Bus adaptor 622 has a device driver (e.g., SCSI/SATA/ATA) that controls the flow of data to and from PDSD 626 and PDSD 628. Bus 624 communicatively couples processor 610 with DRAM 612, ROM 614, input device 616, output device 618, and network adaptor 620. Processor 610 is also communicatively coupled to PDSD 626 and PDSD 628 via bus adaptor 622.

It should be understood that the above descriptions are examples of the present invention, and that various alternatives of the invention described herein may be employed in practicing the invention. For example, although the present invention has been described in terms of file systems, the present invention also applies to data storage systems, such as key value store (KVS), which also utilize metadata. Thus, it is intended that the following claims define the scope of the invention and that structures and methods within the scope of these claims and their equivalents be covered thereby.

What is claimed is:

1. A method of creating a namespace, the method comprising:
   determining whether a namespace already exists before creating a number of metadata area legends;
   when a namespace is determined to already exist:
      deleting existing metadata area legends and existing namespace, and
      determining whether namespace verification has been enabled;
   reserving a number of areas as a number of reserved metadata areas on a persistent data storage device (PDSD) when a namespace is determined not to already exist;
   creating a number of metadata area legends at a location that is logically separate from the reserved metadata areas on the PDSD based on the number of areas reserved for metadata, the number of metadata area legends having a number of existing descriptors that describe the number of reserved metadata areas;
   preparing a number of legends as a number of prepared area legends when namespace verification has been enabled, each prepared area legend including a number of prepared descriptors; and
   signaling an error when the prepared descriptors in the prepared area legend differ from the existing descriptors in the metadata area legend based on a comparison between the prepared descriptors and the existing descriptors.

2. The method of claim 1, wherein:
   the location where the metadata area legends are created is a dedicated partition on the PDSD; and
   the reserved metadata areas are located in a regular partition on the PDSD that is logically separate from the dedicated partition.

3. The method of claim 1, wherein the number of metadata area legends are created on a second PDSD.

4. The method of claim 1, wherein the number of existing descriptors in the metadata area legends includes a magic signature that uniquely identifies a metadata structure in a reserved metadata area.

5. The method of claim 1, wherein:
   a reserved metadata area has a number of nodes, the number of nodes in the reserved metadata area having a single metadata node size; and
   the number of existing descriptors in the metadata area legends includes the single metadata node size.

6. The method of claim 1, wherein:
   the number of reserved metadata areas has a number of extents, each of the extents describing a location of a reserved metadata area; and
   the number of existing descriptors in the metadata area legends includes at least one of the extents.

7. The method of claim 1, wherein the number of existing descriptors in the metadata area legends includes a minimum, default, or maximum clump size value of new reservations of metadata areas.

8. The method of claim 1, wherein the number of prepared descriptors in a prepared area legend include a magic signature, a single metadata node size, and an extent.

9. The method of claim 1, wherein each of the number of metadata area legends corresponds to one of the number of reserved metadata areas.

10. A non-transitory computer-readable medium containing computer executable instructions which when executed by a computer perform a method of adding a metadata area legend to a namespace, the method comprising:
    creating a new metadata area legend that represents a new reserved metadata area, the new metadata area legend including a magic signature of a metadata structure in the new reserved metadata area, a node size in the new reserved metadata area, and an extent of the new reserved metadata area;
    determining if the magic signature in the new metadata area legend matches an existing magic signature in an existing metadata area legend;
    when the magic signature in the new metadata area legend matches an existing magic signature, determining if the node size in the new metadata area legend matches an existing node size in the existing metadata area legend;
    when the node size in the new metadata area legend matches the existing node size, determining if a size of the extent in the new metadata area legend matches a minimum, default, or maximum clump size in the existing metadata area legend; and
    when the size of the extent matches the minimum, default, or maximum clump size, adding the new metadata area legend to the namespace.

11. The non-transitory computer-readable medium of claim 10, wherein the method further comprises:
    adding the new metadata area legend to the namespace when the magic signature in the new metadata area legend does not match any existing magic signature in the namespace.

12. The non-transitory computer-readable medium of claim 10, wherein the method further comprises:
    signaling an error when the node size in the new metadata area legend does not match the existing node size in the existing metadata area legend.

13. The non-transitory computer-readable medium of claim 10, wherein the method further comprises:
    signaling an error when the size of the extent does not match the minimum, default, or maximum clump size.

14. A computer system, comprising:
a first persistent data storage device (PDSD) that stores a number of byte streams at a first location, the number of byte streams representing a number of metadata area legends that have a number of first descriptors, the number of first descriptors describing a number of reserved metadata areas at a second location that is logically separate from the first location where the number of byte streams are stored, the number of metadata area legends created based on the number of reserved metadata areas reserved;
a processor coupled to the first PDSD, the processor configured to:
determine whether a namespace already exists;
determine whether namespace verification has been enabled when an existing namespace is determined to already exist, the existing namespace having the number of first descriptors;
prepare a number of legends as a number of prepared area legends that includes a number of second descriptors that correspond with the number of first descriptors when namespace verification has been enabled;
determine whether the second descriptors from the prepared area legends differ from the first descriptors; and
signal an error when the second descriptors differ from the first descriptors.

15. The computer system of claim 14, wherein:
the number of byte streams are stored in a dedicated partition on the first PDSD; and
the number of reserved metadata areas are located in a regular partition on the first PDSD that is logically separate from the dedicated partition.

16. The computer system of claim 14, further comprising:
a second PDSD coupled to the first PDSD, wherein the number of reserved metadata areas are located on the second PDSD.

17. The computer system of claim 14, wherein the first and second descriptors both include magic signatures.

18. The computer system of claim 14, wherein the first and second descriptors both include node sizes.

19. The computer system of claim 14, wherein:
the number of reserved metadata areas are described by a number of extents; and
the first and second descriptors both include the extents.

* * * * *